(12) United States Patent
Hiroi et al.

(10) Patent No.: US 7,796,857 B2
(45) Date of Patent: Sep. 14, 2010

(54) VIDEO PLAYBACK APPARATUS

(75) Inventors: Kazushige Hiroi, Machida (JP); Yoshifumi Fujikawa, Yokohama (JP); Norikazu Sasaki, Ebina (JP); Riri Ueda, Ebina (JP); Akio Hayashi, Tokyo (JP); Yukio Fujii, Yokohama (JP); Atsuo Kawaguchi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 1180 days.

(21) Appl. No.: 11/154,818

(22) Filed: Jun. 17, 2005

(65) Prior Publication Data

US 2006/0140580 A1    Jun. 29, 2006

(30) Foreign Application Priority Data

Dec. 24, 2004  (JP) ............................. 2004-372535

(51) Int. Cl.
*H04N 5/93* (2006.01)
*G11B 27/00* (2006.01)
*H04N 5/91* (2006.01)
*H04N 7/00* (2006.01)
*G11B 21/08* (2006.01)
*G11B 7/085* (2006.01)
*G11B 27/02* (2006.01)

(52) U.S. Cl. ............................ 386/52; 386/55; 386/46; 369/30.05; 369/47.13; 369/83

(58) Field of Classification Search .................. 386/52, 386/55, 46; 369/30.05, 47.13, 83
See application file for complete search history.

(56) References Cited

U.S. PATENT DOCUMENTS 6,449,422 B1 * 9/2002 Ebisawa ...................... 386/52

(Continued)

FOREIGN PATENT DOCUMENTS

JP      09-247617      9/1997

(Continued)

OTHER PUBLICATIONS

D. Dementhon, et al.; "Video Summarization by Curve Simplification"; Language and Media Processing Laboratory (LAMP); Jul. 1998; pp. 1-19; University of Maryland, College Park, MD 20742-3275.

(Continued)

*Primary Examiner*—Thai Tran
*Assistant Examiner*—Daquan Zhao
(74) *Attorney, Agent, or Firm*—Antonelli, Terry, Stout & Kraus, LLP.

(57) ABSTRACT

A video playback apparatus includes: video data inputting unit; a ranking data inputting/generating unit that inputs or generates ranking data where scenes in video data are ranked according to importance; a playback scene determination parameter inputting unit that inputs parameters when determining scenes to be played back according to importance; a playback scene determining unit that determines playback scenes based on ranking data and playback scene determination parameters; and a display unit that displays playback scenes. A viewing time of video data that the user desires and a maximum time width of each playback scene are inputted to the playback scene determination parameter inputting unit, and the playback scene determining unit cuts scenes so that the playback time of the playback scenes fits the maximum time width, and determines the playback scenes so that the sum of the playback time of the playback scenes fits within the viewing time.

18 Claims, 15 Drawing Sheets

U.S. PATENT DOCUMENTS

| | | | |
|---|---|---|---|
| 6,829,781 B1 * | 12/2004 | Bhagavath et al. | 725/94 |
| 2003/0016945 A1 * | 1/2003 | Nakamura | 386/46 |
| 2006/0147184 A1 | 7/2006 | Hiroi et al. | |

FOREIGN PATENT DOCUMENTS

| | | |
|---|---|---|
| JP | 2000-250944 | 9/2000 |
| JP | 2001-101840 | 4/2001 |
| JP | 2002-281449 | 9/2002 |
| JP | 2002-330393 | 11/2002 |
| JP | 2003-110982 | 4/2003 |
| JP | 2003-153139 | 5/2003 |
| JP | 2003-224790 | 8/2003 |
| JP | 2003-283993 | 10/2003 |
| JP | 2004-040145 | 2/2004 |
| JP | 2004-072396 | 3/2004 |
| WO | WO 01/35416 A2 | 5/2001 |

OTHER PUBLICATIONS

Japanese Official Action dated Oct. 28, 2008 for Application No. P2004-372535.

Japanese Official Action dated Sep. 2, 2008 for Application No. P2004-372537.

* cited by examiner

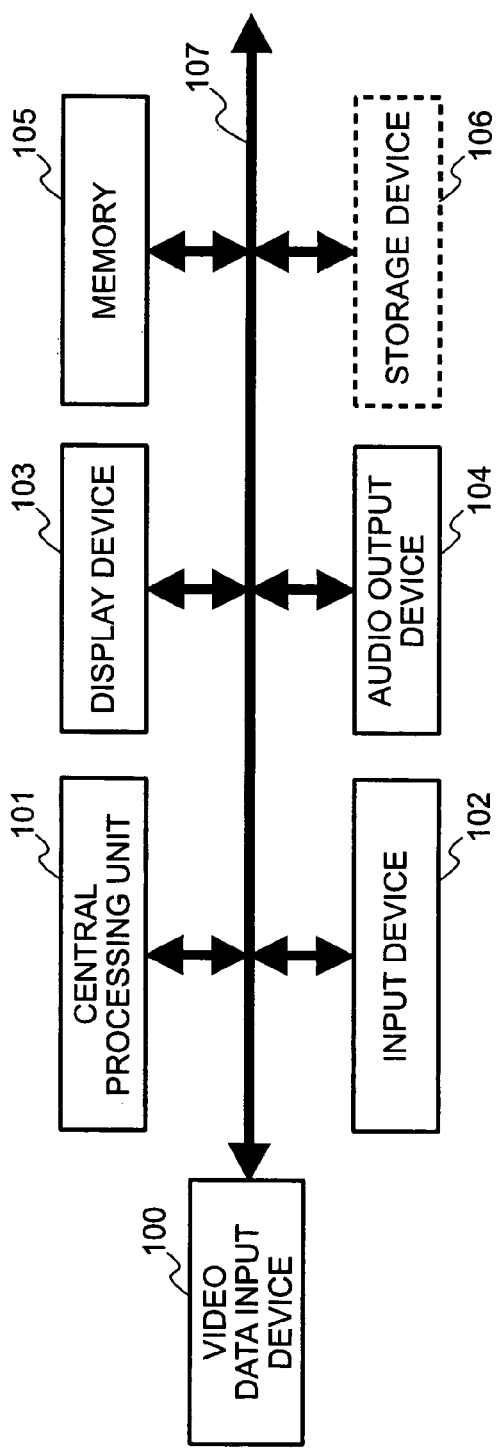
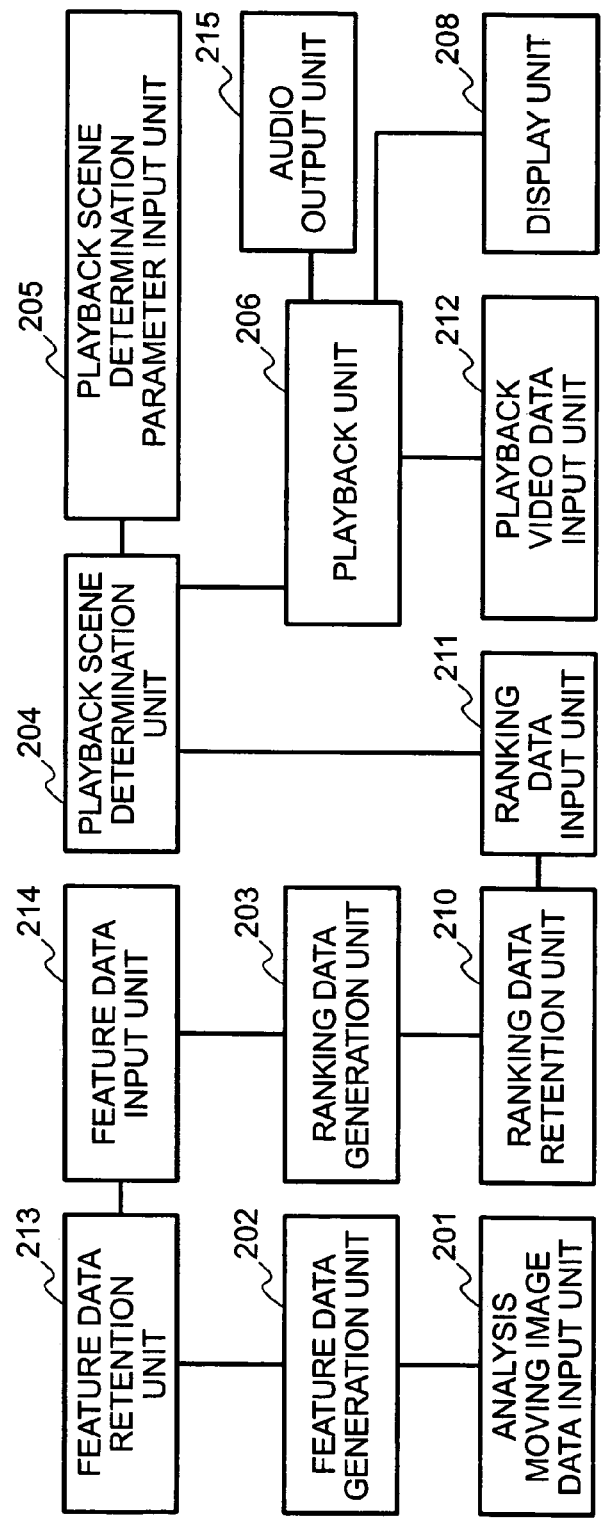
FIG.1
FIG.2

| RANK | START POSITION (SECONDS) | END POSITION (SECONDS) |
|---|---|---|
| 1 | 150 | 155 |
| 2 | 100 | 110 |
| 3 | 20 | 40 |
| 4 | 350 | 460 |
| 5 | 200 | 250 |
| 0 | 0 | 0 |

1Byte    8Byte    8Byte

FIG.6(a)

| RANK | START POSITION (SECONDS) | END POSITION (SECONDS) |
|---|---|---|
| 1 | 150 | 155 |
| 2 | 100 | 110 |
| 4 | 350 | 460 |
| 5 | 200 | 250 |
| 0 | 0 | 0 |

1Byte — 8Byte — 8Byte

FIG.6(b)

| RANK | START POSITION (SECONDS) | END POSITION (SECONDS) |
|---|---|---|
| 1 | 150 | 155 |
| 2 | 100 | 110 |
| 4 | 350 | 460 |
| 0 | 0 | 0 |

1Byte — 8Byte — 8Byte

FIG.6(c)

| RANK | START POSITION (SECONDS) | END POSITION (SECONDS) |
|---|---|---|
| 2 | 100 | 110 |
| 1 | 150 | 155 |
| 4 | 350 | 460 |
| 0 | 0 | 0 |

1Byte — 8Byte — 8Byte

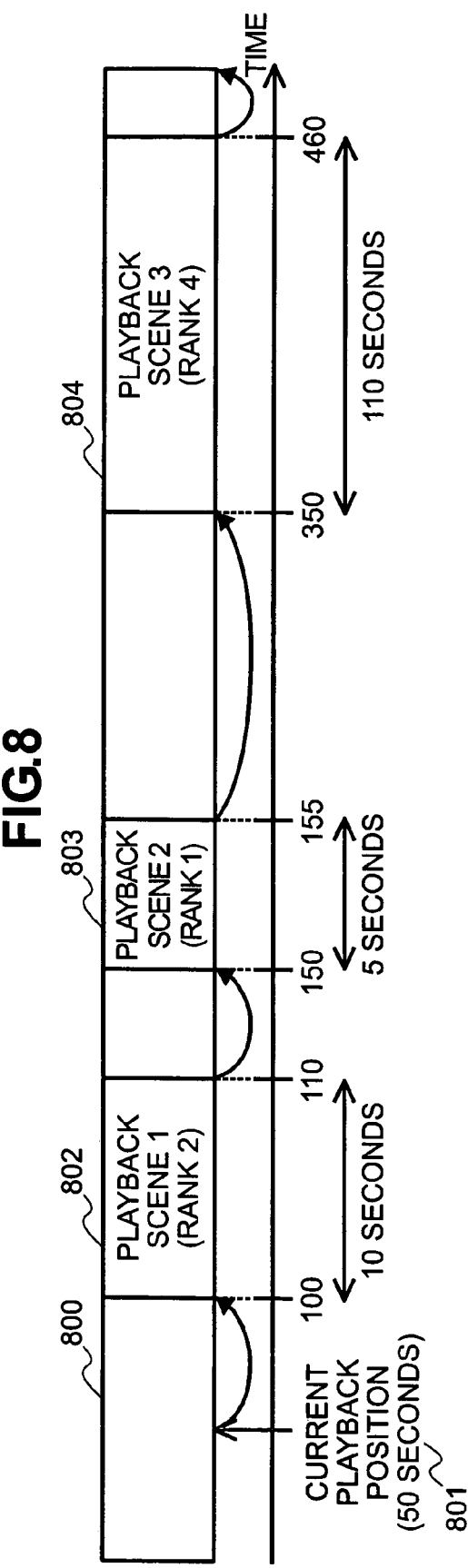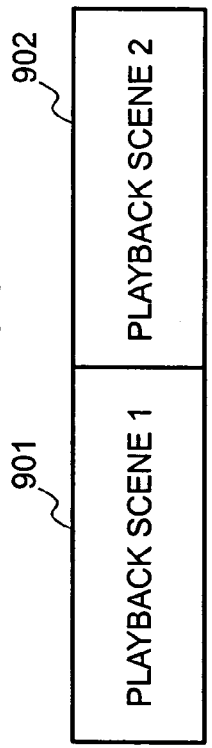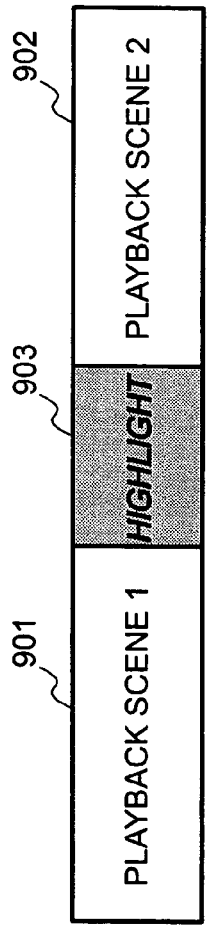

| RANK (301) | START POSITION (SECONDS) (302) | END POSITION (SECONDS) (303) | INSERTION IMAGE (1001) |
|---|---|---|---|
| 2 | 100 | 110 | A |
| 1 | 150 | 155 | B |
| 4 | 350 | 460 | C |
| 0 | 0 | 0 | D |

1Byte | 8Byte | 8Byte | 4Byte 305, 304, 307, 309

| RANK | START POSITION (SECONDS) | END POSITION (SECONDS) |
|---|---|---|
| 1 | 150 | 155 |
| 2 | 100 | 110 |
| 4 | 400 | 410 |
| 5 | 220 | 230 |
| 0 | 0 | 0 |

1Byte — 8Byte — 8Byte

| RANK | START POSITION (SECONDS) | END POSITION (SECONDS) |
|---|---|---|
| 2 | 100 | 110 |
| 1 | 150 | 155 |
| 5 | 220 | 230 |
| 4 | 400 | 410 |
| 0 | 0 | 0 |

1Byte — 8Byte — 8Byte

FIG.16

| RANK | START POSITION (SECONDS) | END POSITION (SECONDS) | REPRESENTATIVE POSITION (SECONDS) |
|---|---|---|---|
| 1 | 150 | 155 | 153 |
| 2 | 100 | 110 | 103 |
| 3 | 20 | 40 | 25 |
| 4 | 350 | 460 | 400 |
| 5 | 200 | 250 | 240 |
| 0 | 0 | 0 | 0 |

1Byte — 8Byte — 8Byte — 8Byte

FIG.17(a)

| RANK (301″) | START POSITION (SECONDS) (302″) | END POSITION (SECONDS) (303″) | REPRESENTATIVE POSITION (SECONDS) (1601) |
|---|---|---|---|
| 1 | 150 | 155 | 153 |
| 2 | 100 | 110 | 103 |
| 4 | 395 | 405 | 400 |
| 5 | 235 | 245 | 240 |
| 0 | 0 | 0 | 0 |

1Byte | 8Byte | 8Byte | 8Byte

FIG.17(b)

| RANK (301″) | START POSITION (SECONDS) (302″) | END POSITION (SECONDS) (303″) | REPRESENTATIVE POSITION (SECONDS) (1601) |
|---|---|---|---|
| 2 | 100 | 110 | 103 |
| 1 | 150 | 155 | 153 |
| 5 | 235 | 245 | 240 |
| 4 | 395 | 405 | 400 |
| 0 | 0 | 0 | 0 |

1Byte | 8Byte | 8Byte | 8Byte

VIDEO PLAYBACK APPARATUS

BACKGROUND OF THE INVENTION

The present invention relates to a video playback apparatus that plays back video data.

In recent years, due to multichannel broadcasting of video data resulting from digital television broadcasting and broad band networks, large amounts of video data have become acquirable or viewable. Also, due to improvements in video compression and decompression technology, reductions in the cost of hardware/software for realizing this, increases in the capacity of storage media, and reductions in the cost of storage media, large amounts of video data can be easily saved, so that the amount of viewable video data is increasing. However, busy people do not have the time required to view all of this video data. As a result, people have become inundated with viewable video data. Thus, it has become important to allow a viewer to view only the important scenes in the available video data, so that people can understand the content of the video data in a short period of time or be able to search for video data that they really want to view.

In light of this situation, technologies that can display important scenes in a large quality of video data have been introduced in JP-A 2003-153139 and in D. Dementhon, V. Kobla and D. Doermann, "Video Summarization by Curve Simplification," *ACM Multimedia* 98, pp. 211-218, 1998 (Bristol, England). Particularly, in the available "Video Summarization by Curve Simplification," technology is introduced in which a feature of video data is generated from the available video data, important scenes are extracted and ranked on the basis of the generated feature, and only the important scenes are played back at a ratio designated by the user. Due to these technologies, the user can grasp the content of the video data in a short period of time.

As described above, technologies have been proposed which allow the user to grasp the content of video data in a short period of time, but a user interface that is preferable for the user has not been proposed. For example, in the technology described in "Video Summarization by Curve Simplification," the user can play back only the important scenes at a ratio designated by the user, but, in actuality, a designation is required for the time to view the content of the video data and to grasp the content of video data within a certain time. Also, in the technology described in "Video Summarization by Curve Simplification," in the case where the user may want to grasp the fact that only the important scenes are being played back by looking at a gauge in which the position of an important scene and the current playback position are displayed, in actuality, there is the potential for this not to be preferable for the user because the display screen on which the gauge is displayed is complicated. Moreover, when only the important scenes are continuously displayed without implementing special means, it becomes difficult for the user to grasp the fact that only the important scenes are being played back.

SUMMARY OF THE INVENTION

In light of these circumstances, the present invention provides a user interface for playing back only the important scenes (in the following description and in the drawings, this will be called "highlight playback"). In particular, the present invention provides a video playback apparatus that can make the user aware, in a manner that is simple and easy to understand, of the fact that highlight playback is being carried out, and with which the user can grasp the content of video data as much as possible up to a time that the user has designated or for a time that the user desires.

In order to address this issue, the video playback apparatus of the present invention includes: video data inputting means that inputs video data; ranking data inputting/generating means that inputs or generates ranking data where scenes in the video data are ranked in accordance with a designated importance; playback scene determination parameter inputting means that inputs parameters for determining scenes to be played back in accordance with the indicated importance; playback scene determining means that determines playback scenes on the basis of the ranking data and the playback scene determination parameters; playback means that plays back the determined playback scenes; and display means that displays the playback scenes. The playback scene determination parameter inputting means inputs a maximum time width for playback and viewing time for playback scenes that the user desires, and the playback scene determining means cuts the scenes so that the playback time for the individual playback scenes fit the specified maximum time width, and determines the playback scenes so that the sum of time for the playback of scenes falls within the specified viewing time. The playback means is configured to display a predetermined image or video between the playback scenes to be played back next as a trigger, such as the fact that playback of the playback scenes determined by the playback scene determining means has ended.

Thus, the user can effectively grasp the content of inundating amounts of viewable video data. Also, a user interface that is preferable to the user performing in highlight playback can be provided.

BRIEF DESCRIPTION OF THE DRAWINGS

FIG. 1 is a block diagram showing an example of a hardware configuration obtained when the functional blocks of a video playback apparatus pertaining to a first embodiment of the invention are realized with software;

FIG. 2 is a functional block diagram showing an example of the video playback apparatus pertaining to the first embodiment;

FIGS. 6(*a*) to 6(*c*) are diagrams illustrating the transition of data processing and showing a playback scene determination method in a playback scene determination unit pertaining to the first embodiment;

FIG. 8 is a diagram showing playback scenes played back in a playback unit pertaining to the first embodiment;

FIGS. 9(*a*) and 9(*b*) are diagrams showing an image representing highlight playback being displayed between playback scenes in the video playback apparatus pertaining to the first embodiment;

FIG. 16 is a diagram showing an example of the data structure of ranking data handled in a third embodiment of the invention;

FIGS. 17(a) and 17(b) are diagrams illustrating the transition of data processing and showing a playback scene determination method in the playback scene determination unit pertaining to the third embodiment;

DETAILED DESCRIPTION OF THE INVENTION

Figures 3, 4:
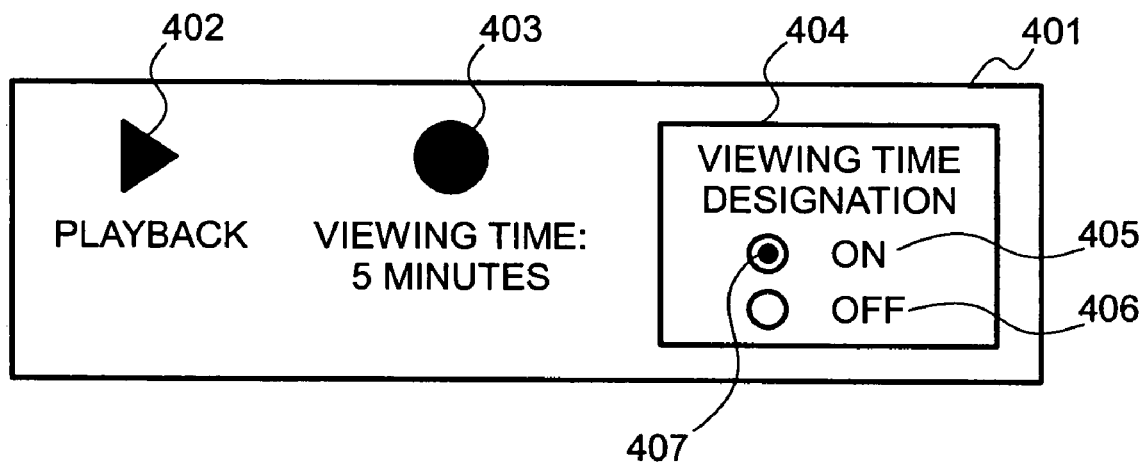
FIG. 3 is a diagram showing an example of the structure of ranking data handled in the first embodiment.
FIG. 4 is a diagram showing an example of a playback operation panel of the video playback apparatus pertaining to the first embodiment.

Embodiments of the present invention will be described below with reference to the drawings.

First Embodiment

FIG. 1 is a block diagram showing an example of the hardware configuration of a video playback apparatus pertaining to a first embodiment of the present invention.

As shown in FIG. 1, the video playback apparatus of the first embodiment is configured to include a video data input device 100, a central processing unit 101, an input device 102, a display device 103, an audio output device 104, a memory 105, and a storage device 106. These devices are interconnected by a bus 107 to enable the devices to mutually transmit and receive information.

The video data input device 100 inputs video data. The video data input device 100 may be provided as a device that reads video data stored in the memory 105 or the storage device 106, or by a television tuner which receives television broadcasts. The video data input device 100 may also be provided in the form of a network card, such as a LAN card, which inputs video data via a network.

The central processing unit 101 is mainly provided by a microprocessor, and it executes programs stored in the memory 105 and the storage device 106.

The input device 102 is a remote controller, a keyboard, or a pointing device, such as a mouse. The input device 102 is configured to allow the user to input playback scene determination parameters at the time of highlight playback.

The display device 103 is provided as a display adapter and a liquid crystal display or a projector, and, in case of inputting playback scene determination parameters at the time of highlight playback via a graphical user interface (GUI), the display device 103 displays the GUI. An example of the GUI will be described in detail later.

The audio output device 104 is a speaker, for example, and it outputs audio included in the video data.

The memory 105 is provided as a random access memory (RAM) and a read-only memory (ROM), and it stores programs executed by the central processing unit 101, data to be processed in the video playback apparatus, video data to be played back, and ranking data and so on.

The storage device 106 is provided in the form of a hard disk, a DVD or CD and drives therefor, or a non-volatile memory, such as a flash memory. The storage device 106 stores programs executed by the central processing unit 101, data to be processed in the video playback apparatus, video data to be played back, and ranking data and so on.

FIG. 2 is a functional block diagram of the video playback apparatus of the first embodiment. Some or all of these functional blocks may be realized as hardware in addition to the hardware shown in FIG. 2, but they may also be realized as software programs executed by the central processing unit 101. Below, an example will be described in which all of these functional blocks are software programs executed by the central processing unit 101.

As shown in FIG. 2, the video playback apparatus is configured to include an analysis video data input unit 201, a feature data generation unit 202, a feature data retention unit 213, a feature data input unit 214, a ranking data generation unit 203, a ranking data retention unit 210, a ranking data input unit 211, a playback video data input unit 212, a playback scene determination unit 204, a playback scene determination parameter input unit 205, a playback unit 206, a display unit 208, and an audio output unit 215.

The analysis video data input unit 201 inputs, from the video data input device 100, video data that is analyzed for generating feature data and ranking data that is necessary for carrying out highlight playback. The analysis video data input unit 201 is executed by the central processing unit 101, when the creation of feature data or ranking data is instructed by the user, or in the case where video data for which feature data or ranking data has not been found at the start of highlight playback, or by an unillustrated scheduler.

The feature data generation unit 202 generates feature data for video data inputted in the analysis video data input unit 201. This can be realized by generating, as a feature, the power of the audio and the movement of an image in regard to frames of audio data and image data in the video data, for example. The feature data generation unit 202 is executed by the central processing unit 101 each time video data is inputted, when the analysis video data input unit 201 is executed.

The feature data retention unit 213 retains the feature data generated in the feature data generation unit 202. This can be realized by storing, in the memory 105 or the storage device 106, the feature data generated in the feature data generation unit 202, for example. The feature data retention unit 213 may be configured to be executed by the central processing unit 101 each time feature data is generated, when the feature data generation unit 202 is executed, or each time feature data of one frame is generated.

The feature data input unit 214 inputs the feature data retained in the feature data retention unit 213 or feature data already generated by another device or the like. This can be realized by reading the feature data stored in the memory 105 or the storage device 106, for example. The feature data input unit 214 may be executed by the central processing unit 101, when the ranking data generation unit 203 is executed. The ranking data generation unit 203 corresponds to ranking data inputting/generating means, and it extracts important scenes and ranks the scenes on the basis of the feature data inputted by the feature data input unit 214. This can be realized by the method disclosed in the article "Video Summarization by Curve Simplification," for example. The ranking data generation unit 203 is executed by the central processing unit 101 when the creation of ranking data is instructed by the user, or at the start of highlight playback, or in the case of video data for which ranking data has not been found by the unillustrated scheduler.

The ranking data retention unit 210 retains the ranking data generated in the ranking data generation unit 203. This can be realized by storing, in the memory 105 or the storage device 106, the ranking data generated in the ranking data generation unit 203, for example. However, in the case where the ranking data generated in the ranking data generation unit 203 is directly read into the playback scene determination unit 204, the ranking data retention unit 210 is not invariably necessary. In case the ranking data retention unit 210 is present, the ranking data retention unit 210 may be configured to be executed by the central processing unit 101, each time ranking data is generated, when the ranking data generation unit 203 is executed.

The ranking data input unit 211 corresponds to ranking data inputting/generating means, and it inputs the ranking data retained in the ranking data retention unit 210 or ranking data already generated by another device or the like. This can be realized by reading the ranking data stored in the memory 105 or the storage device 106. However, in the case where the ranking data generated in the ranking data generation unit 203 is directly read into the playback scene determination unit 204, the ranking data input unit 211 is not invariably necessary. In case the ranking data input unit 211 is present, the ranking data input unit 211 may be configured to be executed by the central processing unit 101 when the playback scene determination unit 204 is executed.

The playback scene determination parameter input unit 205 corresponds to playback scene determination parameter inputting means, and it inputs, via the input device 102, parameters when determining a playback scene at the time of highlight playback. The content and method of inputting these parameters will be described later. The playback scene determination parameter input unit 205 is executed by the central processing unit 101 at the point at or during the time when highlight playback is executed in the playback unit 206, which is to be described later.

The playback scene determination unit 204 corresponds to playback scene determining means, and it determines playback scenes at the time of highlight playback on the basis of the parameters inputted by the playback scene determination parameter input unit 205 and the ranking data generated by the ranking data generation unit 203, or those inputted by the ranking data input unit 211. The method of determining the playback scenes will be described later. The playback scene determination unit 204 is executed by the central processing unit 101, when determining the playback scenes at the highlight playback, after the parameters have been inputted by the playback scene determination parameter input unit 205.

The playback video data input unit 212 corresponds to video data inputting means, and it inputs, from the video data input device 100, video data to be played back. The playback video data input unit 212 is started when acquiring video data to be played back by the playback unit 206, and it is executed by the central processing unit 101.

The playback unit 206 corresponds to playback means; and, it inputs, by way of the playback video data input unit 212, video data of the playback scene determined by the playback scene determination unit 204, generates a playback image, and displays the playback image on the display unit 208. The detailed processing content in the playback unit 206 will be described later. The playback unit 206 is executed by the central processing unit 101, when ordinary playback or highlight playback is instructed by the user.

The display unit 208 corresponds to display means, and it displays, on the display device 103, the playback image generated in the playback unit 206. The display unit 208 displays, on the display device 103, each frame of the playback image that the playback unit 206 has generated. In this case, the display unit 208 is started each time a playback image of one frame is generated by the playback unit 206, and it is executed by the central processing unit 101.

The audio output unit 215 outputs, to the audio output device 104, playback audio generated in the playback unit 206. The audio output unit 215 can be realized by outputting, to the audio output device 104, each frame of the playback audio that the playback unit 206 has generated. In this case, the audio output unit 215 is started each time, when one frame of playback audio is generated by the playback unit 206, and it is executed by the central processing unit 101.

Next, the data structure of the ranking data generated in the ranking data generation unit 203 or inputted by the ranking data input unit 211 will be described.

FIG. 3 is a diagram showing an example of the data structure of the ranking data handled in the first embodiment.

In FIG. 3, reference numerals 304 to 308 identify scenes in video data, and reference numeral 309 identifies data representing the fact that there are no more scenes. Column 301 lists the degree of importance, i.e., the rank, of each scene. Here, for descriptive purposes, the rank is higher the smaller the numerical value is. Columns 302 and 303 list the start position and end position of each scene, respectively. Here, for descriptive purposes, they are represented by the start time (in seconds) and end time (in seconds) of each scene. When the ranking data generation unit 203 generates this data structure, the data structure can be generated by the method disclosed in "Video Summarization by Curve Simplification," or by recognizing scenes in video data by the method disclosed in "Video Summarization by Curve Simplification". Each scene is ranked in the order of the power of the audio, and the time of the start position and the time of the end position of each scene is acquired. At this point, the time of the start position and the time of the end position of each scene can be acquired by acquiring the time stamps corresponding to the frames, if the video data is an MPEG stream, for example. In FIG. 3, the rank 301 of each scene, and the start position 302 and the end position 303 of each scene, are respectively 1 byte and 8 bytes, but the invention is not limited thereto. It suffices for the data to be storable without the data overflowing. In data 309, the rank 301, the start position 302 and the end position 303 are all "0" in order to represent the fact that there are no more scenes, but the invention is not limited thereto. It suffices for the fact that there are no more scenes to be represented.

Next, the GUI for inputting the playback scene determination parameters at the time of highlight playback and the parameters inputted by the playback scene determination parameter input unit 205 will be described.

FIG. 4 is a diagram showing an example of a playback operation panel of the video playback apparatus of the first embodiment.

In FIG. 4, the playback operation panel 401 has a playback button 402, a viewing time designation knob 403, a viewing time designation button group 404, a viewing time designation ON button 405, a viewing time designation OFF button 406, and a playback mode indicator 407.

With respect to the playback operation panel 401, the user selects video data by depressing the playback button 402, whereby the user can start the playback of the video data. Although not illustrated, the selection of the video data can be configured so that a menu for selecting the video data appears when the playback button 402 is depressed. The user can also start the highlight playback by depressing the viewing time designation ON button 405. Conversely, the user can change to ordinary playback, i.e., stop the highlight playback, by depressing the viewing time designation OFF button 406. It will be noted that the viewing time designation ON button 405 and the viewing time designation OFF button 406 are alternately operated, so that highlight playback is performed when the viewing time designation ON button 405 is depressed, while ordinary playback is performed when the viewing time designation OFF button 406 is depressed. In this case, the playback mode indictor 407 is configured to light up in the button that has been depressed. The user can also designate the viewing time of the video data at the time of highlight playback using the viewing time designation knob 403. The viewing time designation knob 403 may be configured so that the viewing time to be set changes as a result of operating the knob, and so that the set viewing time is displayed in the vicinity of the knob. In FIG. 4, the viewing time designation knob 403 is configured so that the set viewing time which has been set is displayed below the knob, as an example.

In the above-described GUI, the playback scene determination parameter input unit 205 acquires the viewing time when the viewing time designation knob 403 is operated in a state in which the viewing time designation ON button 405 is depressed, or it is designated by the viewing time designation knob 403 at the timing when the viewing time designation ON button 405 is depressed.

Next, the method of determining the playback scenes in the playback scene determination unit 204 will be described.

Figure 5:
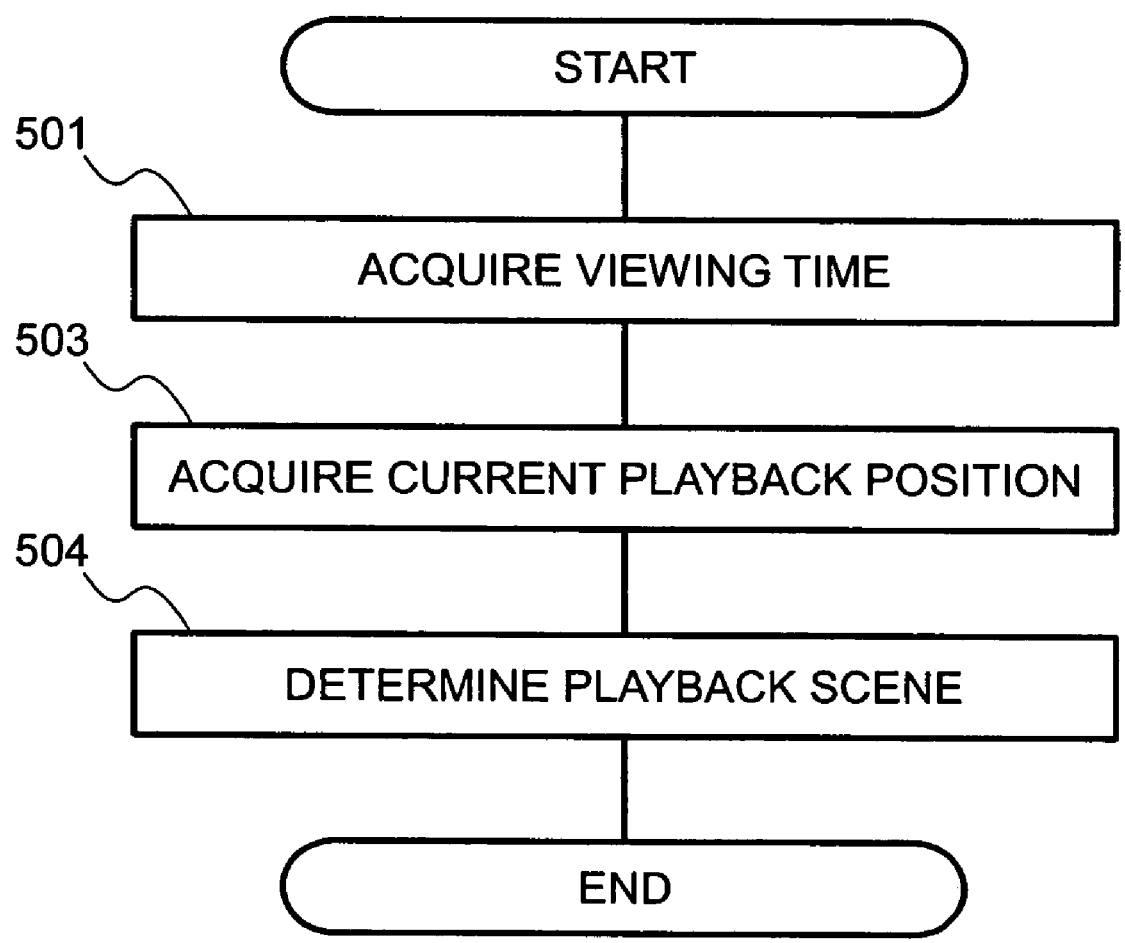
FIG. 5 is a flow chart showing the flow of playback scene determination processing pertaining to the first embodiment.

FIG. 5 is a flow chart showing the flow of playback scene determination processing pertaining to the first embodiment.

As shown in FIG. 5, the playback scene determination unit 204 first acquires the viewing time that the user desires and which is inputted by the playback scene determination parameter input unit 205 (step 501).

Next, the playback scene determination unit 204 acquires the position currently being played back in the video data (step 503). This can be realized by acquiring the time of the frame in the video data currently being played back when video data is currently being played back. This can also be realized by acquiring the time of the first frame in the video data when video data is about to be played back. Acquiring the time of the frame, in the video data can be realized by acquiring the time stamp corresponding to that frame, if the video data is an MPEG stream, for example.

Next, the playback scene determination unit 204 determines the playback scene from the viewing time acquired in step 501 and the current playback position acquired in step 503 (step 504). At this time, the playback scene determination unit 204 first deletes scenes whose end positions are smaller than the current playback position in the ranking data generated by the ranking data generation unit 203 or inputted by the ranking data input unit 211, as shown in FIG. 6(*a*). FIG. 6(*a*) shows an example of a case where the current playback position is 50 seconds with respect to the ranking data shown in FIG. 3. Next, as shown in FIG. 6(*b*), the time of the scenes are accumulated in the order of scenes whose rank is high, and the playback scenes are listed in a range that does not exceed the viewing time acquired in step 501. Namely, the playback scenes are selected in the order of scenes whose rank is high so that the total of the time of the playback scenes does not exceed the viewing time acquired in step 501. FIG. 6(*b*) shows an example of a case where the viewing time acquired in step 501 is 150 seconds, and shows a total of three scenes (accumulated viewing time: 125 sec),—scene 304 with a rank of 1 (viewing time: 5 seconds), scene 305 with a rank of 2 (viewing time: 10 seconds), scene 307 with a rank of 4 (viewing time: 110 seconds)—being selected as the playback scenes. In this case, scene 308 with a rank of 5 may be optionally cut to 25 seconds and selected as a playback scene. In this case, the first 25 seconds of the scene may also be selected, or 25 seconds including the middle of the scene may be selected. Moreover, when the current playback position is in the middle of the scene, the time of that scene may be corrected from the current playback position to the end position. For example, in the example of FIGS. 6(*a*) to 6(*c*), when the current playback position is 105 seconds, the start position of scene 305 with a rank of 2 is 105 seconds, and the end position may be calculated as 110 seconds. The playback scene determination unit 204 finally rearranges the selected/determined playback scenes in the order of the start time of playback scenes, as shown in FIG. 6(*c*), and then it determines the rearranged playback scenes as the final playback scenes.

Next, the playback processing in the playback unit 206 will be described.

Figure 7:
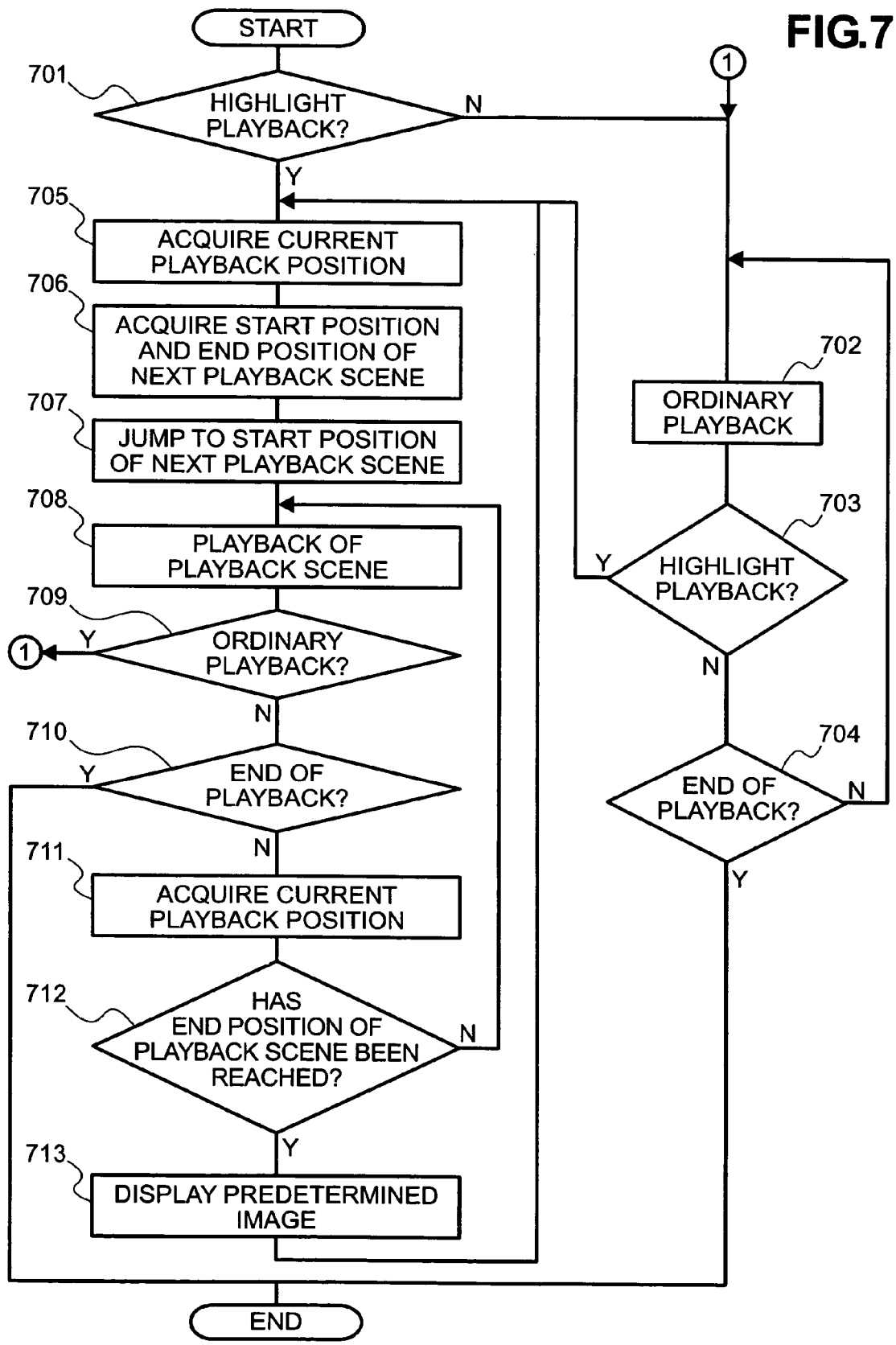
FIG. 7 is a flow chart showing an example of the flow of playback processing pertaining to the first embodiment.

FIG. 7 is an example of a flow chart showing the flow of the playback processing pertaining to the first embodiment.

As shown in FIG. 7, the playback unit 206 first determines whether or not highlight playback has been designated by determining whether or not the viewing time designation ON button 405 has been depressed (step 701).

As a result of the determination in step 701, when it has been determined that highlight playback has not been designated, ordinary playback is carried out (step 702). With respect to ordinary playback, a description thereof will be omitted because it is already being widely carried out, but in the video playback apparatus of the present invention, it is determined whether highlight playback has been designated by periodically determining whether the viewing time designation ON button 405 has been depressed (step 703). When playback has ended without highlight playback being designated (step 704), playback ends. In the ordinary playback here, it is determined that playback has ended when all of the video data have been displayed, or when the end of playback has been instructed by the user. Other than that, ordinary playback continues.

As a result of the determination in step 701, when it is determined that highlight playback has been instructed, highlight playback is executed by the following. Namely, first, the current playback position in the video data is acquired (step 705), and the start position and end position of the next playback scene is acquired on the basis of the current playback position (step 706). This can be realized by acquiring, of the playback scenes determined by the playback scene determination unit 204, the start position and end position of the playback scene that follows the current playback position and is closest to the current playback position.

Next, the playback unit 206 jumps to the start position of the next playback scene acquired in step 706 (step 707), and it plays back that playback scene (step 708). This is implemented by displaying a playback image in the playback scene on the display device 103 via the display unit 206, and by outputting the playback audio in the playback scene to the audio output device 104 via the audio output unit 206. During the playback of the playback scene, it is determined whether ordinary playback has been designated (step 709) by periodically determining whether the viewing time designation OFF button 406 has been depressed. When ordinary playback has been designated, the processing moves to the ordinary playback of steps 702 to 704. Also, during the playback of the same playback scene, it is periodically determined whether or not playback has ended (step 710), and, when playback has ended, the playback of the video data ends. In the case of highlight playback, it is determined that playback has ended when all of the playback scenes determined by the playback scene determination unit 204 have been played back, or when the end of playback has been instructed by the user. Other than that, playback of the playback scenes continues. Moreover, during the playback of the same playback scene, the current playback position is periodically acquired (step 711), and it is determined whether or not the end position of that playback scene has been reached (step 712). This can be determined by comparing the end position of the playback scene acquired in step 706 with the current playback position acquired in step 711. As a result of the determination in step 712, when it is determined that the end position of that playback scene has not been reached, steps 708 to 712 are repeated and playback of that playback scene continues. As a result of the determination in step 712, when it has been determined that the end position of that playback scene has been reached, a predetermined image representing highlight playback (to be described later) is displayed on the display device 103 via the display unit 206 (step 713), and then steps 705 to 713 are repeated, whereby the playback scenes determined by the playback scene determination unit 204 are sequentially played back. When all of the playback scenes determined by the playback scene determination unit 204 have been played back, this fact is identified in step 710 and playback ends. Thus, as shown in FIG. 8, the playback unit 206 jumps to each playback scene to play only the playback scenes determined by the playback scene determination unit 204.

FIG. 8 is a diagram illustrating the playback scenes that are played back in the playback unit 206 pertaining to the first embodiment. In FIG. 8, the reference numeral 800 represents all of the video data, and the reference numeral 801 represents the current playback position. The reference numerals 802 to 804 represent playback scenes determined by the playback scene determination unit 204. In FIG. 8, the current playback position is the position of 50 seconds, and the playback scenes determined in FIGS. 6(*a*) to 6(*c*) are shown as the playback scenes determined by the playback scene determination unit 204, as an example. In the video playback apparatus, the playback unit 206 sequentially jumps from the current playback position to playback scene 1, playback scene 2 and playback scene 3, so as to play back only those playback scenes.

Next, the display of a predetermined image representing highlight playback in step 713 will be described.

FIGS. 9(*a*) and 9(*b*) are diagrams showing an image representing highlight playback being displayed between playback scenes. In FIGS. 9(*a*) and 9(*b*), reference numerals 901 and 902 are playback scenes determined by the playback scene determination unit 204. Reference numeral 901 represents one playback scene, and reference numeral 902 represents the next playback scene to be played back after the playback scene 901. Reference numeral 903 represents the predetermined image that is displayed between the playback scenes and represents highlight playback.

Figures 10, 11:
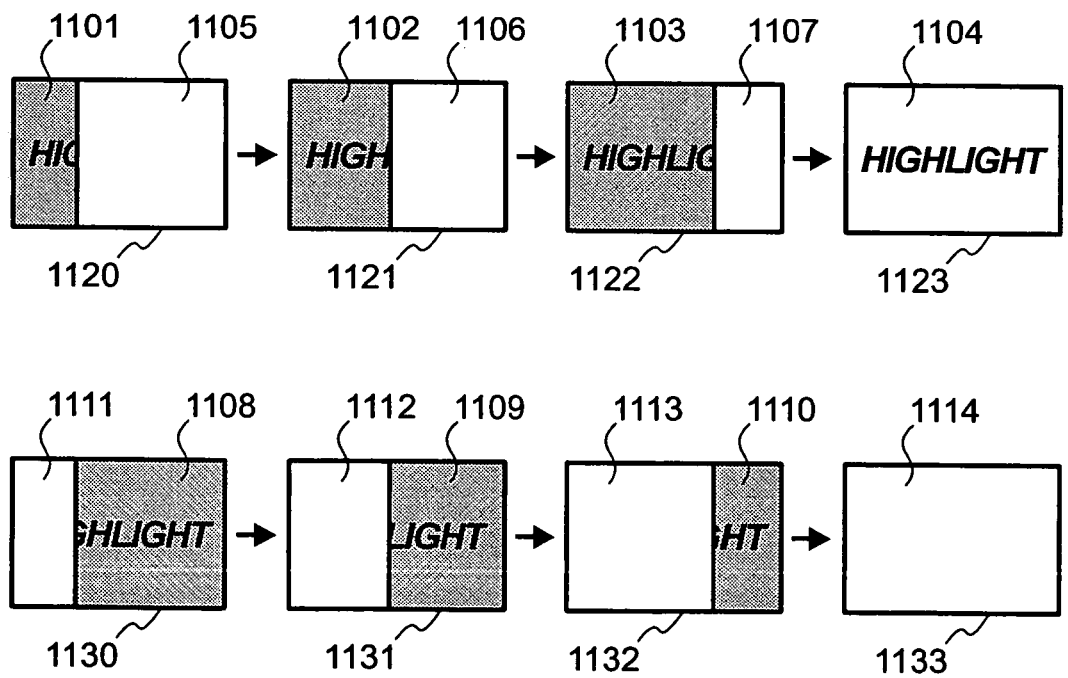
FIG. 10 is a diagram showing an example of the data structure of playback scenes generated in the playback scene determination unit pertaining to the first embodiment, and, in particular, showing a case including data relating to images displayed between playback scenes.
FIG. 11 is a diagram showing an example of an image representing highlight playback being wipe-displayed in the video playback apparatus pertaining to the first embodiment.

Ordinarily, the space between one playback scene and the next playback scene to be played back is temporally discontinuous, but as shown in FIG. 9(*a*), when the playback scenes are continuously played back and displayed, it becomes difficult to distinguish highlight playback from ordinary playback. Thus, in the present video playback apparatus, as shown in FIG. 9(*b*), this distinction can be facilitated by displaying a predetermined image representing highlight playback between the playback scenes. This can be realized by displaying the predetermined image 903 in step 713 of the playback unit 206. Specifically, this can be realized by storing the predetermined image 903 in a determined region of the memory 105 or the storage device 106, using, as a trigger, the fact that the playback unit 206 has reached the end position in the playback of the playback scenes, and displaying the image 903. In this case, the playback unit 206 can start playback beginning with the start position of the next playback scene after displaying the image 903 for a set period of time using a timer. Also, as shown in FIG. 10, the playback unit 206 may also be configured to set an image to be displayed between the playback scenes when the playback scenes are determined in the playback scene determination unit 204. FIG. 10 is a diagram in which an image 1001, that is displayed between the playback scenes, is added to the data shown in FIG. 6(*c*), and, particularly, in which an image is added that is displayed before each playback scene is played back. Specifically, the image 1001 may comprise an ID of an image to be displayed, or an address to image data stored in the memory 105 or the storage device 106. Thus, the image displayed between the playback scenes can be changed. For example, by displaying images in which the sequential numbers or ranks of the playback images are displayed, the user can easily grasp which playback scene is to be played back next. Also, as shown in FIG. 11, an image in which part of the image representing highlight playback is slightly shifted may be merged with an image of the final few frames in the previous playback scene, the merged image may be displayed as the image of the final few frames in the previous playback scene, an image in which part of the image representing highlight playback is slightly shifted may be merged with an image of the first few frames in the next playback scene, and the merged image may be displayed as the image of the first few frames in the next playback scene, whereby the image displayed between the playback scenes can be wipe-displayed and will be easy for the user to recognize. In FIG. 11, reference numerals 1105 to 1107 designate the final three frames in the previous playback scene, reference numerals 1101 to 1104 designate images in which part of the image representing highlight playback is slightly shifted, and reference numerals 1120 to 1123 designate images in which the image of the final three frames in the previous playback scene is merged with the image in which part of the image representing highlight playback is slightly shifted. Also, reference numerals 1111 to 1114 designate the first four frames in the next playback scene, reference numerals 1108 to 1110 designate images in which part of the image representing highlight playback is slightly shifted, and reference numerals 1130 to 1133 designate images in which the image of the first four frames in the next playback scene is merged with the image in which part of the image representing highlight playback is slightly shifted. In the present embodiment, when the previous playback scene ends, the final four frames are displayed in the order of 1120 to 1123, and when the next playback scene begins, the first four frames are displayed in the order of 1130 to 1133. Thus, because the playback scenes become unconnected, the user can easily grasp the fact that highlight playback is being carried out.

In the description of the present embodiment, a configuration was considered where the video playback apparatus itself generated the feature and ranking data of the video data, but it is not invariably necessary for the video playback apparatus itself to generate the feature and ranking data of the video data. For example, the invention may also be configured to read feature or ranking data generated by another device and to implement highlight playback on the basis of that data. In this case, when the feature data is not generated by the video playback apparatus, the analysis video data input unit 201, the feature data generation unit 202 and the feature data retention unit 213 may be removed from the functional blocks shown in FIG. 2, the feature data input unit 214 may be configured to read the generated feature data, and the processing relating to the removed functional blocks does not have to be carried out. Also, when the generation of the ranking data is not carried out, the feature data input unit 214, the ranking data generation unit 203 and the ranking data retention unit 210 may be removed from the functional blocks shown in FIG. 2, the ranking data input unit 211 may be configured to read the generated ranking data, and the processing relating to the removed functional blocks does not have to be carried out. Also, in the description of the present embodiment, an example was considered where the viewing time of the video data was designated, but the invention may also be configured so that the time at which viewing ends is designated. In this case, an interface for inputting the viewing end time may be provided, and the difference between the viewing end time and the current time may be calculated when the viewing end time is inputted, whereby the viewing time is calculated and the calculated viewing time is used.

According to the video playback apparatus of the first embodiment, as described above, the user can made aware, in a manner that is simple and easy to understand, of the fact that highlight playback is being carried out, and the user can grasp the content of video data as much as possible up to a time that the user has designated or a time that the user desires.

Second Embodiment

A second embodiment of the present invention provides a video playback apparatus that enables the user to designate a maximum time width of the playback scenes.

Figure 12:
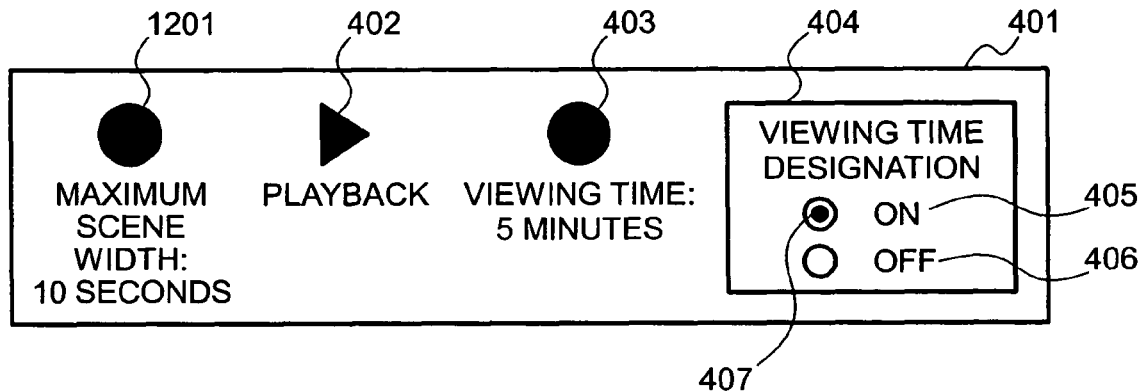
FIG. 12 is a diagram showing an example of a playback operation panel of a video playback apparatus pertaining to a second embodiment of the invention.

FIG. 12 is a diagram showing an example of a playback operation panel of the video playback apparatus pertaining to the second embodiment.

As shown in FIG. 12, the playback operation panel of the video playback apparatus pertaining to the second embodiment comprises the same playback operation panel of the video playback apparatus pertaining to the first embodiment, with the addition of a maximum scene width setting knob 1201. The user can set the maximum time width of each playback scene in highlight playback using the maximum scene width setting knob 1201. The video playback apparatus of the second embodiment may be configured so that the maximum time width to be set is changed by operating the maximum scene width setting knob 1201, and so that the maximum time width which is set is displayed in the vicinity of the maximum scene width setting knob 1201. In the second embodiment, the maximum time width is displayed below the maximum scene width setting knob 1201, for example.

In this case, in addition to the processing described in connection with the first embodiment, the playback scene determination parameter input unit 205 acquires the maximum time width of each playback scene set by the maximum scene width setting knob 1201 when the maximum scene width setting knob 1201 is operated in a state where the viewing time designation ON button 405 is depressed or at the time when the viewing time designation ON button 405 is depressed.

Next, the method of determining the playback scenes in the playback scene determination unit 204 pertaining to the second embodiment will be described.

Figure 13:
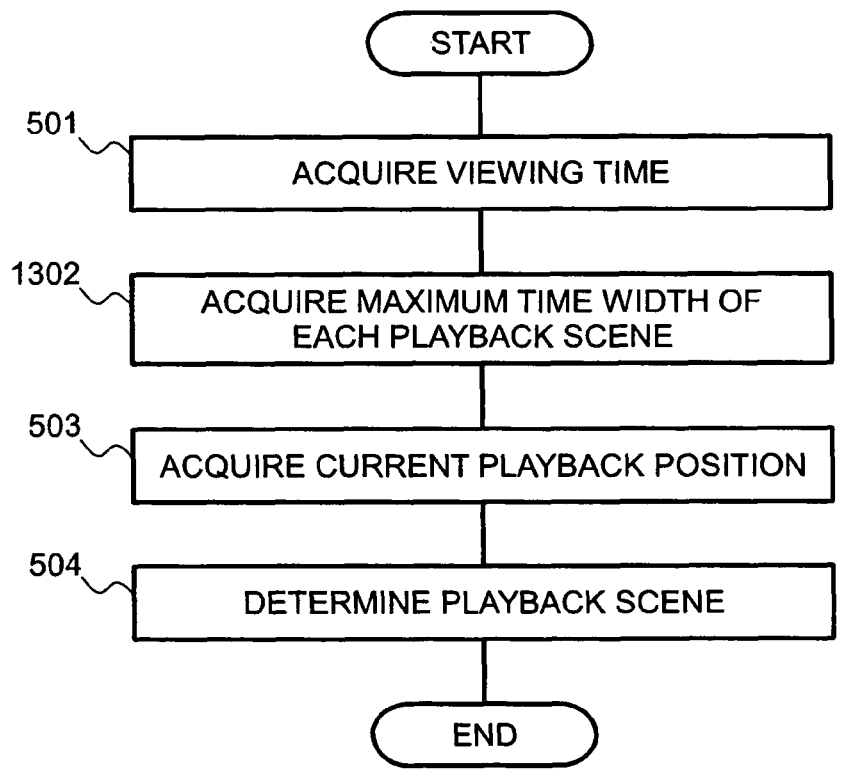
FIG. 13 is a flow chart showing an example of the flow of playback scene determination processing pertaining to the second embodiment.

FIG. 13 is a flow chart showing the flow of the playback scene determination processing pertaining to the second embodiment.

Figures 14A, 14B, 15:
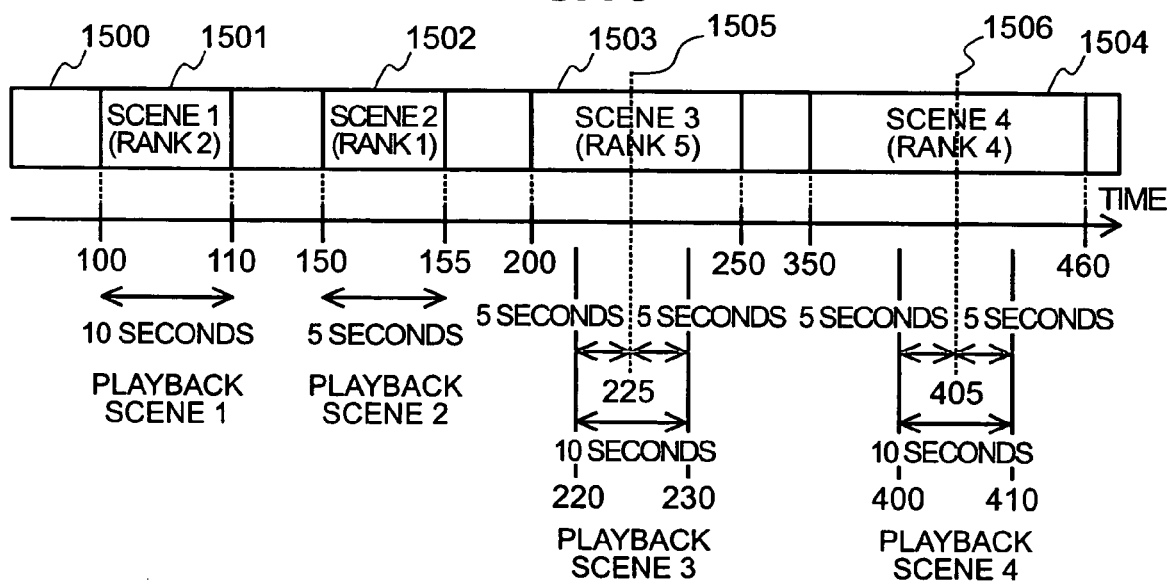
FIGS. 14(a) and 14(b) are diagrams illustrating the transition of data processing and showing a playback scene determination method in a playback scene determination unit pertaining to the second embodiment.
FIG. 15 is a diagram illustrating the method of determining playback scenes in the playback scene determination unit pertaining to the second embodiment, and, in particular, an example of a method of cutting each playback scene to fit within a maximum time width.

As shown in FIG. 13, the playback scene determination unit 204 pertaining to the second embodiment comprises the same processing by the playback scene determination unit 204 of the first embodiment, with the addition of step 1302 of acquiring the maximum time width of each playback scene inputted by the playback scene determination parameter input unit 205. Then, in step 504, the playback scenes are determined from the viewing time acquired in step 501, the maximum time width of each playback scene acquired in step 1302, and the current playback position acquired in step 503. The specific method will be described with reference to FIGS. 14(*a*) and 14(*b*). In FIG. 14(*b*), an example is shown where the current playback position is 50 seconds and the maximum time width of each playback scene is 10 seconds with respect to the ranking data shown in FIG. 3. In order to determine the playback scenes, as shown in FIG. 14(*a*), the playback scene determination unit 204 first deletes scenes whose end positions are smaller than the current playback position in the same manner as the processing described in connection with the first embodiment, and then it cuts scenes so that the maximum time width of each playback scene fits the maximum time width of each playback scene acquired in step 1302. At this time, as shown in FIG. 15, scenes may be cut to include the middle of the start positions and the end positions of the scenes in the ranking data with respect to scenes whose time widths in the ranking data are greater than the maximum time width of each playback scene acquired in step 1302.

In FIG. 15, reference numeral 1500 represents all of the video data, and reference numerals 1501 to 1504 represent scenes in the ranking data. Here, when the maximum time width of each playback scene acquired in step 1302 is 10 seconds, for example, scenes 3 (1503) and scene 4 (1504) exceed the maximum time width, and so, the before and after periods of 5 seconds (for a total of 10 seconds) of the 225 seconds (1505) and the 405 seconds (1506), that are at the middle of the start positions and end positions of those scenes, are used as the playback scenes. However, this is only meant to serve as an example, and it is not invariably necessary to use the before and after periods of 5 seconds from the middle as the playback scenes. However, it is preferable to use as much as possible of the middle of the scenes as the playback scenes. Thereafter, the playback scene determination unit 204 accumulates, in the same manner as the playback scene determination unit 204 pertaining to the first embodiment, the playback time of the playback scenes in the order of scenes with higher ranks, and it lists the playback scenes in a range that does not exceed the viewing time acquired in step 501. In FIG. 14(*a*), in the same manner as that which was described in connection with the first embodiment, when the viewing time acquired in step 501 is 150 seconds, all of the playback scenes are selected. Finally, in the same manner as in the first embodiment, the playback scene determination unit 204 rearranges the selected/determined playback scenes in the order of the playback time thereof and determines the final playback scenes. The finally determined playback scenes are shown in FIG. 14(*b*).

Other than that which was described above, the configuration and processing in the second embodiment are the same as those in the first embodiment, but due to the above-described processing, more playback scenes can be viewed in a limited period of time with the video playback apparatus of the second embodiment, in comparison to the video playback apparatus described in connection with the first embodiment.

Third Embodiment

A third embodiment of the present invention provides a video playback apparatus where important images in each scene are displayed even when, with respect to the second embodiment, the maximum time width of each playback scene is designated by the user and scenes are cut.

In the third embodiment, as shown in FIG. 16, the ranking data generation unit 203 is configured to generate, in addition to the rank 301, the start position 302 and the end position 303 of each scene, and representative positions 1601" that can be considered as being important or which have to be represented in each scene. Alternatively, the ranking data input unit 211 may input ranking data having that configuration. In order for the ranking data generation unit 203 to generate data of the representative positions, the ranking data generation unit 203 may be configured to calculate the frames whose audio power is large in each scene and use the positions of those frames as the representative positions. In this case, the data of the positions of the frames may be acquired by acquiring the time stamps corresponding to the display time of the frames, if the video data is an MPEG stream. Thus, the time may be used as the data of the representative positions. In FIG. 16, the representative positions 1601" are 8 bytes, but the invention is not limited thereto. It suffices for the invention to be configured so that the data can be stored without overflowing.

The playback scene determination unit 204 pertaining to the third embodiment determines each playback scene in step 504 of FIG. 13 described in connection with the second embodiment so that the representative position of each scene is included. The specific method will be described with reference to FIGS. 17(*a*) and 17(*b*). Similar to the case described in connection with the second embodiment, FIGS. 17(*a*) and 17(*b*) show an example where the current playback position is 50 seconds and the maximum time width of each playback scene is 10 seconds, with respect to the ranking data shown in FIG. 3. Also, description will be given of a case where the representative positions of each scene are those shown in FIG. 16.

Figure 18:
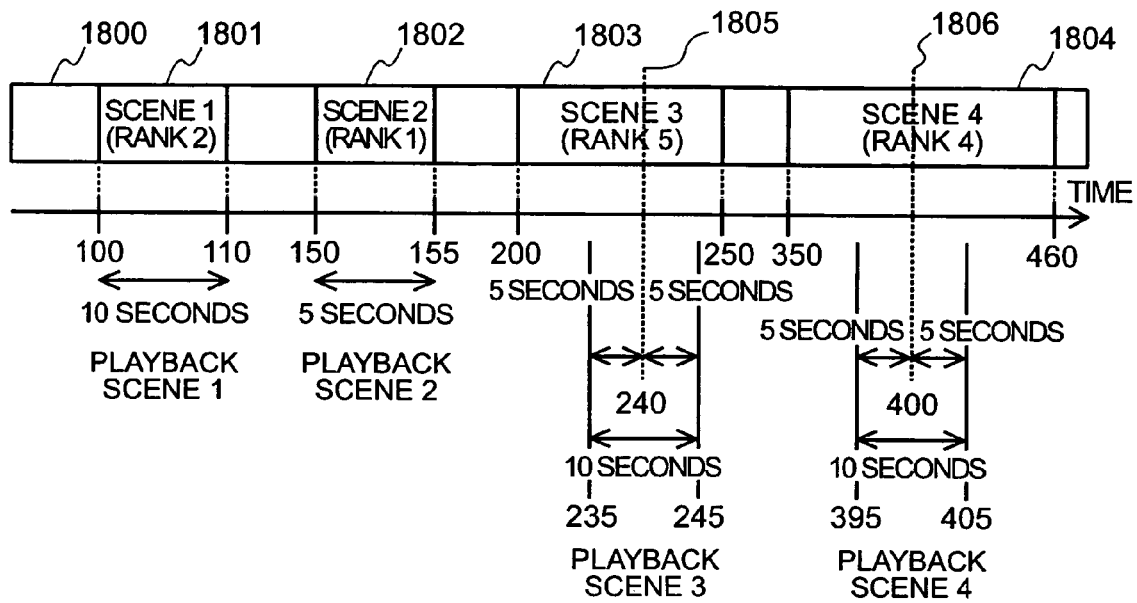
FIG. 18 is a diagram illustrating a method of determining playback scenes in the playback scene determination unit pertaining to the third embodiment, and, in particular, an example of a method of cutting each playback scene, including a representative position in the scene, to fit within a maximum time width.

In order to determine the playback scenes, as shown in FIG. 17(*a*), the playback scene determination unit 204 pertaining to the third embodiment first deletes scenes whose end positions are smaller than the current playback position in the same manner as the processing described in the connection with first embodiment, and it then cuts scenes so that the maximum time width of each playback scene fits the maximum time width of each playback scene acquired in step 1302. At this time, as shown in FIG. 18, scenes may be cut to include the representative positions of the scenes in the ranking data with respect to scenes whose time widths in the ranking data are greater than the maximum time width of each playback scene acquired in step 1302. In FIG. 18, the reference numeral 1800 represents all of the video data, and reference numerals 1801 to 1804 represent scenes in the ranking data. Here, when the maximum time width of each playback scene acquired in step 1302 is 10 seconds, for example, scene 3 (1803) and scene 4 (1804) exceed the maximum time width, and so, the before and after periods of 5 seconds (for a total of 10 seconds) of the 240 seconds (1805) and the 400 seconds (1806) that are the representative positions of those scenes are used as the playback scenes. However, this is only meant to serve as an example, and it is not invariably necessary to use the before and after periods of 5 seconds from the middle as the playback scenes. However, it is preferable to cut the scenes so that the representative positions are, as much as possible, in the vicinity of the middle of the scenes.

Thereafter, the playback scene determination unit 204 accumulates, in the same manner as the playback scene determination unit 204 pertaining to the second embodiment, the playback time of the playback scenes in the order of scenes with higher ranks, and it lists the playback scenes in a range that does not exceed the viewing time acquired in step 501. In FIG. 17(*a*), in the same manner as that which was described in connection with the second embodiment, when the viewing time acquired in step 501 is 150 seconds, all of the playback scenes are selected. Finally, in the same manner as in the second embodiment, the playback scene determination unit 204 rearranges the selected/determined playback scenes in the order of playback time and determines the final playback scenes. The finally determined playback scenes are shown in FIG. 17(*b*).

Other than that which was described above, the configuration and processing in the third embodiment are the same as those in the second embodiment, but due to the above-described processing, the video playback apparatus of the third embodiment can reliably display important images of each scene in comparison to the video playback apparatus described in connection with the second embodiment.

Fourth Embodiment

The fourth embodiment provides a video playback apparatus that enables the user to designate the range of highlight playback in the video contents.

Figure 19:
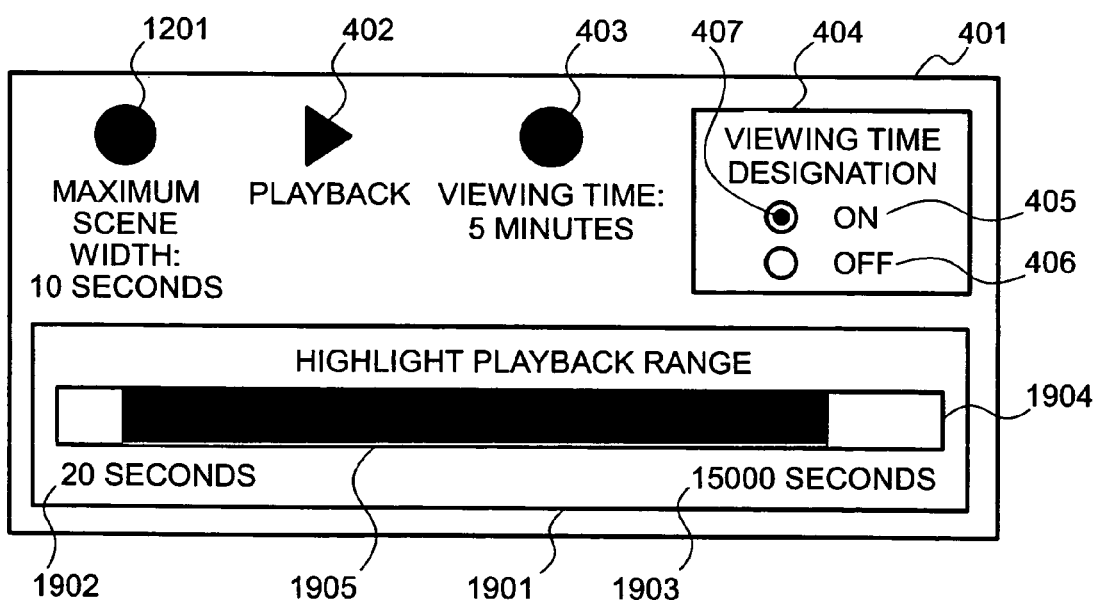
FIG. 19 is a diagram showing an example of a playback operation panel of a video playback apparatus pertaining to a fourth embodiment of the invention.

FIG. 19 is a diagram showing an example of a playback operation panel of the video playback apparatus pertaining to the fourth embodiment.

As shown in FIG. 19, the playback operation panel of the video playback apparatus pertaining to the fourth embodiment includes an interface for designating at least a start position 1902 and an end position 1903 of the highlight playback. FIG. 19 shows an example where a bar 1904 representing the entire length of the video data is added to an interface group 1901 for designating the range of highlight playback. By using the input device 102 to point to the positions corresponding to the start position 1902 and the end position 1903 of highlight playback in the bar 1904, the user can designate the start position 1902 and the end position 1903 of highlight playback. FIG. 19 also shows an example where the space between the selected start position 1902 and the end position 1903 of highlight playback is colored as a highlight playback range 1905. The start position 1902 and the end position 1903 of highlight playback can be calculated, on the basis of the positions pointed to with the input device 102 in the bar 1904, from the ratio between the pointed-to positions with respect to the entire bar 1904 and the entire length of the video data.

In addition to the processing described in connection with the first to third embodiments, the playback scene determination parameter input unit 205 acquires the start position and the end position of highlight playback when the start position 1902 and end position 1903 of highlight playback are changed or set in a state where the viewing time designation ON button 405 is depressed or at the time when the viewing time designation ON button 405 is depressed.

Then, before determining the playback scenes, the playback scene determination unit 204 acquires the start position and end position of highlight playback acquired by the playback scene determination parameter input unit 205; and, at the time of playback scene determination, it first deletes scenes not included in the range of the start position and end position of highlight playback, and it then implements the playback scene determination processing described in connection with the first to third embodiments.

Thus, with the video playback apparatus of the fourth embodiment, the highlight scenes can be effectively viewed without implementing play back of unwanted portions in the video data. Namely, when a certain program has been recorded, the video playback apparatus can implement highlight playback with respect to only the desired program even with respect to video data in a case where different programs have also been inadvertently recorded before and after the desired program.

Fifth Embodiment

A fifth embodiment of the invention provides a video playback apparatus that can display, in the image representing highlight playback displayed between playback scenes, the scene number and rank number of the playback scene to be played back next.

Figure 20:
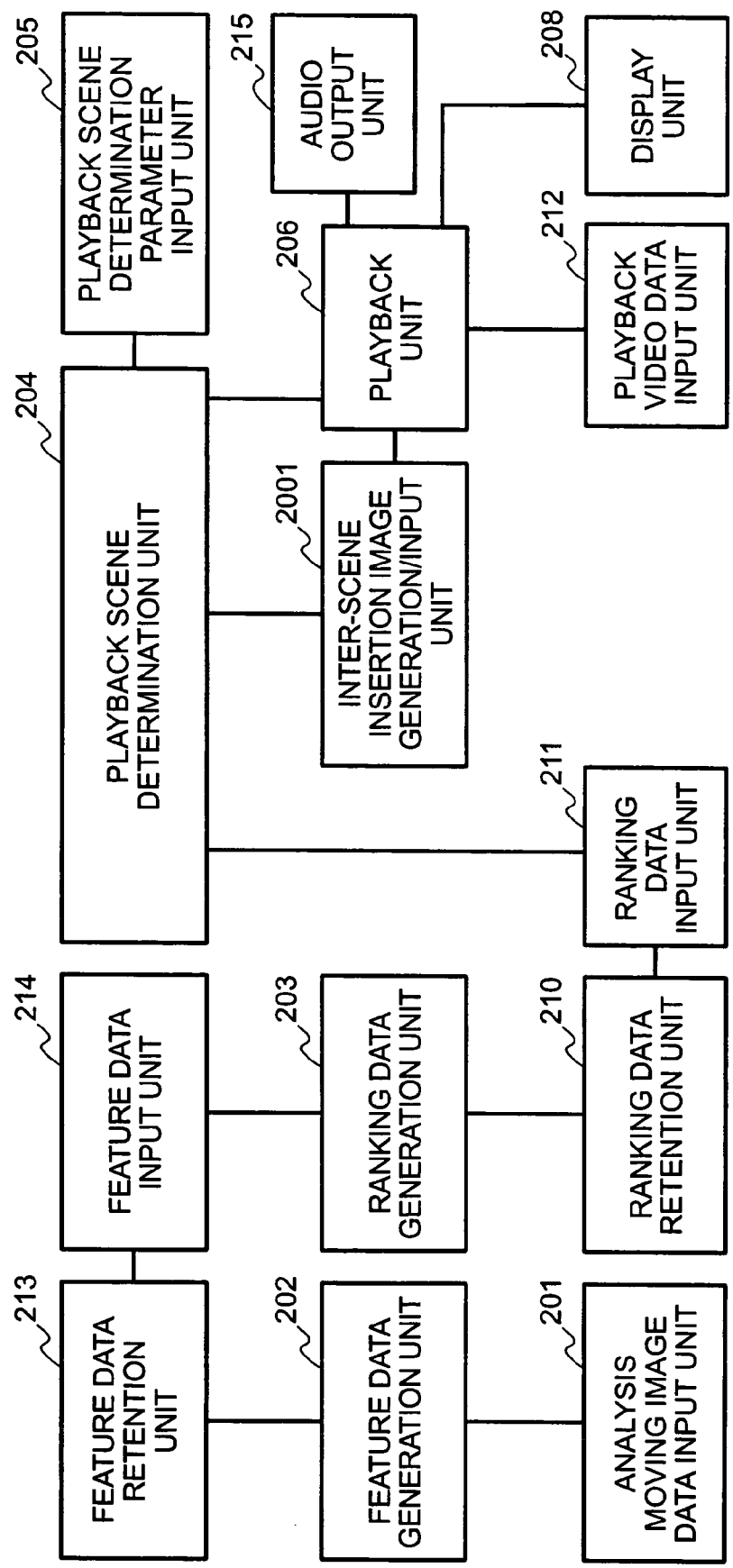
FIG. 20 is a functional block diagram showing an example of a video playback apparatus pertaining to a fifth embodiment of the invention.

FIG. 20 is a functional block diagram of the video playback apparatus pertaining to the fifth embodiment.

As shown in FIG. 20, the video playback apparatus pertaining to the fifth embodiment is configured to include, in addition to the functional blocks of the first to fourth embodiments, an inter-scene insertion image generation/input unit 2001.

The inter-scene insertion image generation/input unit 2001, which corresponds to an inter-scene insertion image generating/inputting means, is started prior to display of the predetermined image in the playback unit 206 (step 713 in FIG. 7), is executed by the central processing unit 101, and generates an image that represents highlight playback that is displayed between playback scenes. Specifically, when the inter-scene insertion image generation/input unit 2001 is started, the inter-scene insertion image generation/input unit 2001 acquires the predetermined image described in FIGS. 9(a) and 9(b), acquires the rank of the next playback scene from the playback scene determination unit 204, writes a string (e.g., "rank 1") generated on the basis of that rank number on the previously acquired predetermined image, and generates an image that is displayed between the playback scenes and represents highlight playback. Alternatively, the inter-scene insertion image generation/input unit 2001 may count which number the next playback scene is, write a string (e.g., "scene 1") generated on the basis of that number on the previously acquired predetermined image, and generate the image that is displayed between the playback scenes and represents highlight playback. Alternatively, the playback scene determination unit 205 and the playback unit 206 may manage the scene number of the next playback scene, and the inter-scene insertion image generation/input unit 2001 may acquire the scene number of the next playback scene from the playback scene determination unit 204 and the playback unit 206, write a string (e.g., "scene 1") generated on the basis of that number on the previously acquired predetermined image, and generate the image that is displayed between the playback scenes and represents highlight playback.

Instead of acquiring the predetermined image in step 713, the playback unit 206 displays the image generated in the inter-scene insertion image generation/input unit 2001. Thus, the user can easily grasp the fact that highlight playback is being carried out and also obtain information relating to the next playback scene.

Sixth Embodiment

A sixth embodiment of the present invention provides a video playback apparatus in which the fact that highlight playback is being carried out is always displayed.

Figure 21:
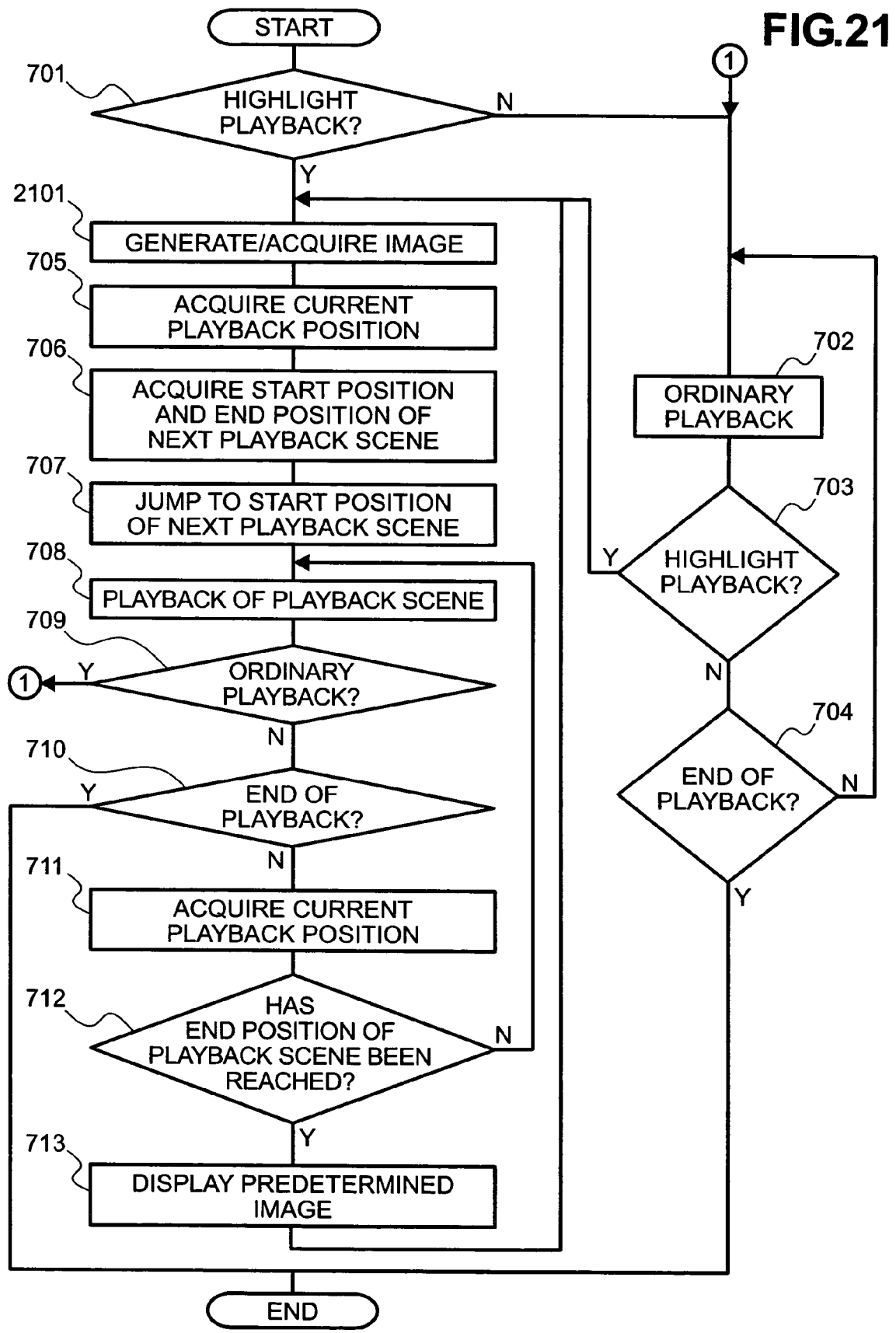
FIG. 21 is a flow chart showing an example of playback processing pertaining to a sixth embodiment of the invention.

FIG. 21 is a flow chart showing the flow of the playback processing executed by the playback unit 206 pertaining to the sixth embodiment.

Figure 22:
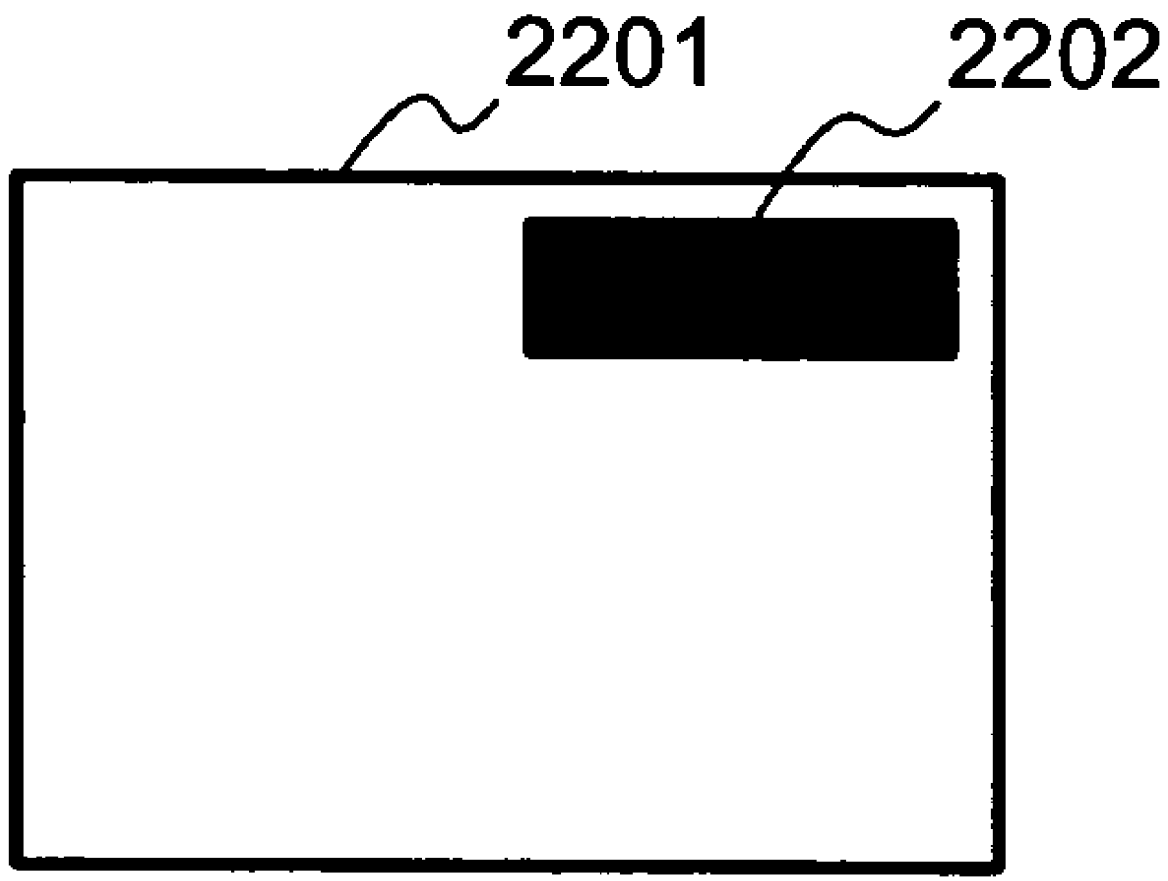
FIG. 22 is a diagram showing an example of an image, representing highlight playback being superposed and displayed on a playback image in the video playback apparatus pertaining to the sixth embodiment.

As shown in FIG. 21, the playback processing executed by the playback unit 206 pertaining to the sixth embodiment comprises the same processing used in the first to fifth embodiments, with the addition of image generation/acquisition processing (step 2101) before the playback of the playback scenes at the time of highlight playback. In the image generation/acquisition processing, an image that is smaller than the playback images—for example, an image where a predetermined string such as "highlight" is imaged—is generated or a predetermined image is acquired from the memory 105 or the storage device 106. Then, when the playback scenes are played back in step 708, the image generated/acquired in step 2101 is superposed on the frame image configuring each playback scene. Thus, as shown in FIG. 22, an image 2202 representing the fact that highlight playback is being carried out can always be displayed on a playback image 2201. In this case, buttons with which the user can set the superposed position of the image 2202 on the playback image 2201 (such as "top," "bottom," "right," "left," "upper right," "upper left," "lower right," and "lower left") may be disposed on the operation panel, and the image 2202 may be superposed on the basis of the specified position when the image 2202 is to be superposed in step 708.

Also, in the image generation/acquisition processing (step 2101), a unique image may be generated for the next playback scene, and this image may be superposed on the playback image in step 708. In this case, in the image generation/acquisition processing, the rank of the next playback scene may be acquired from the playback scene determination unit 204 and a string (e.g., "rank 1") generated on the basis of the rank number may be imaged, or the number of the next playback scene may be counted in the playback unit 206 and a string (e.g., "scene 1") generated on the basis of the counted value may be imaged in the image generation/acquisition processing.

Alternatively, the playback scene determination unit 204 may manage the scene number of the next playback scene, the scene number of the next playback scene may be acquired from the playback scene determination unit 204 in the image generation/acquisition processing, and a string (e.g., "scene 1") generated on the basis of that scene number may be imaged. Thus, an image unique to the playback scene is displayed on the playback image, the user can easily grasp the fact that highlight playback is being carried out, and the user can also obtain information relating to the next playback scene.

In the present embodiment, an image representing the fact that highlight playback is being carried out can be displayed between the playback scenes in step 713, or an image representing the fact that highlight playback is being carried out does not have to be displayed between the playback scenes in step 713 because the image representing the fact that highlight playback is being carried out is always displayed on the playback image.

Also, in connection with the present embodiment, an example was described where the image representing the fact that highlight playback is being carried out was superposed on the playback image, but it is not invariably necessary for the image to be superposed on the playback image. For example, the image may also be displayed in a region different from that of the playback image. Moreover, in the present embodiment, an image is used to represent the fact that highlight playback is being carried out, but it is not invariably necessary for this to be an image. For example, using the same idea, this can also be realized by a string representing the fact that highlight playback is being carried out or a string representing information of the playback scenes being displayed in a region different from that of the playback image.

As described above, in the sixth embodiment, the user can always grasp the fact that highlight playback is being carried out because the fact that highlight playback is being carried out is always displayed.

Seventh Embodiment

A seventh embodiment of the present invention provides a video playback apparatus where the fact that highlight playback is being carried out is represented by use of a simpler method.

In the seventh embodiment, an indicator representing the fact that highlight playback is being carried out is first disposed on the video playback apparatus or on a display screen. Then, the indicator is controlled to light up when the playback unit 206 is implementing highlight playback, and it is extinguished in other cases. In this instance, an image representing the fact that highlight playback is being carried out may be displayed as in the previous embodiments, or the image representing the fact that highlight playback is being carried out does not have to be displayed, because the user can grasp the fact that highlight playback is being carried out from the indicator.

Thus, because it is unnecessary to operate the display image, a video playback apparatus can be provided which represents, with a simpler configuration than the configurations described in connection with the first to sixth embodiments, the fact that highlight playback is being carried out.

Eighth Embodiment

An eighth embodiment of the present invention provides a video playback apparatus that can notify the user of the fact that highlight playback can be implemented.

In the eighth embodiment, an indicator representing the fact that highlight playback can be conducted is disposed on the video playback apparatus or a display screen. Then, the indicator is controlled to light up when the ranking data input unit 211 has inputted the ranking data or when the ranking data generation unit 203 has generated the ranking data, and it is extinguished in other cases.

Thus, the user can grasp at a glance whether or not highlight playback for the video data that the user wants to view is possible in the video playback apparatus.

It will be noted that the present invention is applicable to hard disk recorders, video tape recorders, personal computers, portable terminals, and monitoring systems capable of playing back video data.

What is claimed is:

1. A video playback apparatus comprising:
a video data inputting unit that inputs video data;
a feature data generation unit that generates feature data on the basis of a power of audio in the video data and a movement of an image in the video data;
a ranking data generating unit that generates ranking data of scenes in the video data in accordance with an importance of the scenes determined on the basis of the feature data;
a playback scene determination parameter inputting unit that inputs playback scene determination parameters when determining scenes to be played back, in accordance with the importance of the scenes;
a playback scene determining unit that determines playback scenes, on the basis of the ranking data and the playback scene determination parameters;
a playback unit that plays back the determined playback scenes; and
a output unit that outputs playback images of the determined playback scenes played back by the playback unit;
wherein the playback scene determination parameter inputting unit inputs a viewing time of the video data, and the playback scene determining unit determines playback scenes such that the sum of the time of the determined playback scenes is within the viewing time.

2. The video playback apparatus according to claim 1, wherein the playback scene determining unit determines the playback scenes in the order of scenes with the highest ranks in the ranking data.

3. The video playback apparatus according to claim 2, wherein the playback unit plays back each playback scene determined by the playback scene determining unit, in the order of the time series in the video data.

4. The video playback apparatus according to claim 2, wherein the inter-scene insertion image generation/input unit acquires, from the playback scene determining unit, the rank of the playback scene to be played back next, and generates, on the basis of this rank, an image or video to be displayed between the playback scenes.

5. The video playback apparatus according to claim 1, wherein
the playback scene determination parameter inputting unit further inputs a maximum time width for each playback scene, and
the playback scene determining unit cuts the playback scenes so that the playback time of each individual playback scene fits the maximum time width, and determines the playback scenes so that the sum of the playback time widths of the playback scenes is within the viewing time.

6. The video playback apparatus according to claim 5, wherein the playback scene determining unit determines the playback scenes in the order of scenes with the highest ranks in the ranking data.

7. The video playback apparatus according to claim 6, wherein the playback unit plays back each playback scene determined by the playback scene determining unit, in the order of the time series in the video data.

8. The video playback apparatus according to claim 5, wherein when the playback time of scenes in the ranking data is greater than the maximum time width of each playback scene inputted by the playback scene determination parameter inputting unit, the playback scene determining unit cuts the scenes so that they fit the maximum time width of each playback scene inputted by the playback scene determination parameter inputting unit including the time in the middle of the playback time of each scene in the ranking data, and determines the playback scenes so that the sum of the playback time of the playback scenes are within the viewing time.

9. The video playback apparatus according to claim 5, wherein the ranking data include a representative position in each scene, and when the playback time of scenes in the ranking data is greater than the maximum time width of each playback scene inputted by the playback scene determination parameter inputting unit, the playback scene determining unit cuts the scenes including the representative positions of those scenes in the ranking data so that they fit the maximum time width of each playback scene inputted by the playback scene determination parameter inputting unit, and determines the playback scenes so that the sum of the playback time of the playback scenes are within the viewing time.

10. The video playback apparatus according to claim 1, wherein the playback unit displays a predetermined image or video between the playback scenes to be played back next as a trigger, the fact that playback of the playback scenes determined by the playback scene determining unit has ended.

11. The video playback apparatus according to claim 10, wherein
the video playback apparatus further includes an inter-scene insertion image generation/input unit that generates or inputs an image or video to be displayed between the playback scenes, and
the playback unit displays the image or video generated or inputted by the inter-scene insertion image generation/input unit as a trigger, and the fact that playback of the playback scenes determined by the playback scene determining unit has ended, between the playback scenes to be played back next.

12. The video playback apparatus according to claim 11, wherein the inter-scene insertion image generation/input unit counts what number in all of the playback scenes the playback scene to be played back next is, and generates, on the basis of the counted playback scene number, the image or video to be displayed between the playback scenes.

13. The video playback apparatus according to claim 10, wherein the playback unit wipe-displays the image or video to be displayed between the playback scenes.

14. The video playback apparatus according to claim 13, wherein the playback unit merges and wipe-displays the image or video to be displayed between the playback scenes with the playback scene to be played back next or the previously played back playback scene.

15. The video playback apparatus according to claim 1, wherein the playback unit superposes and displays a predetermined image or video on the playback scenes.

16. The video playback apparatus according to claim 1, wherein the video playback apparatus further includes an indicator that represents the fact that only important scenes in the video data are being played back, and the indicator is configured to represent the fact that only important scenes are being played back when the playback means is playing back only important scenes.

17. The video playback apparatus according to claim 1, wherein the video playback apparatus further includes an indicator that represents the fact that only important scenes in the video data are playable, and the indicator is configured to represent the fact that only important scenes are playable when the ranking data are inputted or generated in the ranking data generating unit.

18. The video playback apparatus according to claim 1, wherein the playback scene determination parameter inputting unit inputs a target range when only important scenes in the video data are to be played back, and the playback scene determining unit determines the playback scenes on the basis of this target range.

* * * * *